US008600056B2

(12) United States Patent
Heurtaux et al.

(10) Patent No.: US 8,600,056 B2
(45) Date of Patent: Dec. 3, 2013

(54) METHOD AND SYSTEM FOR CONTROLLING THE LOCKING/UNLOCKING OF THE NETWORK ACCESS FUNCTIONS OF A MULTIFUNCTION TERMINAL

(75) Inventors: Frédéric Heurtaux, Le Puy Sainte Reparade (FR); Jean-Charles Jorel, Cergy (FR)

(73) Assignee: Apple Inc., Cupertino, CA (US)

( * ) Notice: Subject to any disclaimer, the term of this patent is extended or adjusted under 35 U.S.C. 154(b) by 1295 days.

(21) Appl. No.: 11/943,940

(22) Filed: Nov. 21, 2007

(65) Prior Publication Data

US 2008/0125094 A1 May 29, 2008

(30) Foreign Application Priority Data

Nov. 23, 2006 (FR) ...................................... 06 10274

(51) Int. Cl.
*H04L 29/06* (2006.01)
(52) U.S. Cl.
USPC ................. 380/255; 380/247; 726/4; 726/26; 726/28
(58) Field of Classification Search
USPC ........................................................ 380/255
See application file for complete search history.

(56) References Cited

U.S. PATENT DOCUMENTS

| | | | |
|---|---|---|---|
| 5,991,413 A * | 11/1999 | Arditti et al. ..................... 705/77 |
| 6,591,095 B1 * | 7/2003 | Palaniswamy et al. ........ 455/411 |
| 6,856,800 B1 * | 2/2005 | Henry et al. ..................... 455/411 |
| 2002/0078351 A1 * | 6/2002 | Garib ............................... 713/168 |
| 2002/0099663 A1 * | 7/2002 | Yoshino et al. .................. 705/65 |
| 2004/0157584 A1 * | 8/2004 | Bensimon et al. .............. 455/411 |
| 2008/0003980 A1 * | 1/2008 | Voss et al. ....................... 455/411 |
| 2008/0046739 A1 * | 2/2008 | Adams et al. ................... 713/176 |

FOREIGN PATENT DOCUMENTS

| EP | 1675029 A2 | 6/2006 |
|---|---|---|
| WO | 2004025896 A1 | 3/2004 |
| WO | 2005051018 A1 | 6/2005 |

OTHER PUBLICATIONS

Chen-Chi Lin, Lein Harn and Chi-Sung Laih, Multiple-Public-Key (MPK) Certificate Format, Sep. 2001, Internet Engineering Task Force, retrieved from http://tools.ietf.org/html/draft-lin-mpk-app-00 on Nov. 20, 2012.*

* cited by examiner

*Primary Examiner* — Harunur Rashid
*Assistant Examiner* — Gary Lavelle

(57) ABSTRACT

A method and system of controlling the locking/unlocking of the network access functions of a terminal including a security processor, like a mobile telephone handset. The terminal is allotted an original public key for verifying the integrity of data loaded into the terminal, a pair of keys associated with the network being generated along with an original approval certificate for the terminal, a locking certificate containing the original approval certificate, the public keys, configuration data and random data, this locking certificate being signed on the basis of the private key associated with the original public key and loaded into the terminal.

On entering a user code, the terminal or a function thereof is unlocked after verification of the integrity of the locking certificate and validation of the user code entered.

16 Claims, 3 Drawing Sheets

METHOD AND SYSTEM FOR CONTROLLING THE LOCKING/UNLOCKING OF THE NETWORK ACCESS FUNCTIONS OF A MULTIFUNCTION TERMINAL

FIELD OF THE INVENTION

The invention relates to the control of the locking/unlocking of the network access functions of multifunction terminals.

BACKGROUND OF THE INVENTION

Multifunction terminals are playing a growing predominant role within the framework of the exchanging of data, audio, video services between user of these terminals, by virtue, on the one hand, of the constant increase in their processing performance, and, on the other hand, of the transmission capacities in terms of bit rate and/or bandwidth allowable for networks permitting these exchanges.

One of the typical, nonlimiting, examples of terminals of this type is given by mobile telephone terminals or handsets, which allow the execution of multiple functions, while the mobile telephone networks in which the GSM network, or the UMTS network, more recent, illustrate the growing increase in their transmission capacities.

When, in particular, the aforesaid multifunction terminals are mobile telephone handsets, they allow the implementation of numerous functions, proposed and implemented under the control of the network operator.

As a general rule, multifunction terminals usually comprise, in addition to a central processor unit, a security processor in communication with the latter and allowing the execution of a public-key cryptography system, allowing or participating in the implementation of these multiple functions.

Such is the case of mobile telephone handsets which customarily comprise a SIM card (Subscriber Identity Module), which usually plays the role of security processor.

A SIM card is in fact a chip card containing a memory and a microcontroller. The most recent SIM cards are able to host applications intended for the subscriber. The GSM or UMTS network operators can remotely update the content of certain files of the SIM card. The microcontroller ensures access to the data files and application files, in terms of access entitlements to the functions of the terminal or mobile handset, in particular the cryptography functions, related for example to access code values, and the execution of the applications or functions controlled by the network operator.

More specifically, the control of the aforesaid functions is executed by means of a restriction/inhibition mechanism for technical functions or services at the level of each handset, as defined minimally by the ETSI TS 101 624 V7.0.0 standard and designated SIM card locking, or SIMLOCK.

According to the aforesaid standard, the restrictions relate essentially to the locking of network access, the mobile handset being able, for example, only to connect to a predefined set of GSM/UMTS networks. Other technical functions may moreover be protected by this mechanism, such as for example, access to the Internet through the WAP protocol (Wireless Application Protocol), access to MMS multimedia messaging servers, or the like.

The user of the handset is able to reactivate any locked or restricted technical function by entering, by way of the keypad of the handset, a value of a relatively short specific unlocking code comprising between 8 and 16 decimal digits.

Customarily, locking/unlocking codes are available simultaneously on a given handset, each of the aforesaid codes activating or inhibiting one or more technical or service functions.

The locking/unlocking codes are generated randomly in the SIM card manufacturer's installations and stored in each handset, before being communicated to the network operator by way of a communication channel defined by a common agreement.

The aforesaid mode of operation exhibits the following drawbacks however.

The short length of the locking/unlocking codes makes it very difficult to protect them. In particular, these codes are too short to form signatures obtained through an asymmetric-key signature algorithm, so that they are, usually, protected by symmetric-key cryptographic algorithms.

Due to the short length of the codes, it is relatively easy to conduct an exhaustive attack in order to retrieve the codes or define new ones. Protection may vary from one host platform to another, depending on the security capabilities of the hardware.

Code leaks or compromises may emanate from SIM card manufacturers, since:
  they produce these codes and must register them in each handset;
  they must be capable of communicating these codes to a network operator even after a determined time duration.

Consequently, these codes are kept in the manufacturer's databases for a long time, so the latter must be highly secure.

This fact may impair the relationships between manufacturers and operators, since, when a leak occurs, there is always a doubt as to the origin of the leak, network operator or manufacturer's databases.

The object of the present invention is to remedy all of the aforesaid drawbacks.

In particular, an object of the present invention is the strengthening of the security of management of codes for locking/unlocking the network access functions of multifunction terminals, in particular SIM cards forming the security processor of such terminals.

Another object of the present invention is moreover to render the management of locking/unlocking codes by the manufacturers of security processors, in particular of SIM cards, totally independent of the management undertaken by network operators, the method and the system which are the subject of the invention making it possible to remove the need for the manufacturers to know the locking/unlocking codes of handsets.

Another object of the present invention is the implementation of a mechanism for securing the management of codes for locking/unlocking the network access functions of multifunction terminals, on the basis of a minimal hardware platform including a secure boot or startup entity allowing at least one authentication before startup, provided either through booting locked by One-Time Password (OTP),or by security ROM code available on more recent chips.

Another object of the present invention is the implementation of a trusted execution environment providing a method and a system for strengthened control of the locking/unlocking of the network access functions of multifunction terminals, this environment being able, in a nonlimiting advantageous manner, to be implemented by virtue of a SIM card.

Another object of the present invention, within the framework of the aforesaid trusted environment, is the implementation of an effective and robust parry against attacks from malicious tamperers attempting to alter or delete cryptographic data signed by the network operator.

Another object of the present invention, within the framework of the aforesaid trust environment, is the implementation of an effective and robust parry against exhaustive attacks, aimed at reconstructing one or more locking/unlocking codes, by controlling the response timing and/or the number of responses of the service processor of the SIM card to the authentication of the locking/unlocking code entered by the user, thereby enabling any exhaustive attack to be rendered almost impossible or very difficult.

Another object of the present invention, within the framework of the aforesaid trust environment, is finally, although any manufacturer of a SIM card or a security processor and any network operator are induced to share secrets, the implementation of this trust environment in the absence of the addition of new relational constraints between them.

The method and the system for controlling the locking/unlocking of the network access functions of a multifunction terminal furnished with a security processor, which are the subject of the invention, execute a public-key cryptography system.

They are noteworthy in that they consist in respectively are implemented by allotting this terminal an original public key serving to verify the integrity of the data loaded into said terminal, generating a pair of keys, public key, private key associated with the access network of this terminal, generating an original approval certificate for the terminal containing these public keys, original public key and public key associated with the access network of this terminal, establishing for initialization a locking certificate for this terminal containing at least the original approval certificate for this terminal, data for initial configuration of this terminal and a sequence of random data, and storing the locking certificate and the public key associated with the access network of this terminal, signed digitally on the basis of a private key compatible with the original public key, in a secure area of the security processor. On boot up for use of this terminal by introduction of a code by a user, they make it possible to verify at least, in the absence of an unlocking certificate for at least one function of the terminal or the presence of an invalid unlocking certificate, the integrity of this locking certificate and the elements contained in this locking certificate, and then to unlock and authorize the use of this terminal or of a specific function of this terminal, conditionally upon the successful verification of this locking certificate and upon the validity of the code introduced. This terminal or this specific function is kept locked in the absence of authorization of use, otherwise.

According to another noteworthy aspect of the method and of the system which are the subjects of the present invention, in the presence of a valid unlocking certificate, this unlocking certificate is substituted for the locking certificate in order to continue the process.

According to another noteworthy aspect of the method and of the system which are the subjects of the invention, the step of verifying the locking certificate includes at least the transmission, from the terminal to the security processor, of the locking certificate, of the unlocking certificate if it exists and of the user code.

According to another noteworthy aspect of the method and of the system which are the subjects of the invention, said security processor, in particular, executes the verifying of the integrity of the original approval certificate for the terminal; and, on successful verification, the validating of the locking certificate by means of the original public key; and, following this validation, the establishing of the whole set of codes that can be introduced by the user, on the basis of the random data sequence contained in the locking certificate or of a specific function executed by the security processor.

According to another noteworthy aspect of the method and of the system which are the subjects of the invention, the aforementioned specific function makes it possible to generate the whole set of valid unique codes that can be generated by the user, a code associated with a function of the terminal being generated for one and only one terminal.

According to another aspect, the method and the system which are the subjects of the invention are finally noteworthy in that the security processor compares any code entered by the user with the whole set of valid unique codes. If the code entered by the user does not correspond to any of the codes of the set of valid unique codes, the security processor generates an error code, returned to the terminal and the configuration of the terminal corresponding to the locking certificate or to an unlocking certificate that is preexisting is kept.

BRIEF DESCRIPTION OF THE DRAWINGS

Otherwise, if the code entered by the user corresponds to a unique code of the set of unique codes, the security processor generates an unlocking certificate relating to the corresponding function and verifies the integrity of this unlocking certificate.

The method and the system for controlling the locking/unlocking of the network access functions of a multifunction terminal furnished with a security processor, which are the subjects of the invention, will be better understood on reading the description and looking at the drawings below, in which.

DETAILED DESCRIPTION OF THE INVENTION

A more detailed description of the method for controlling the locking/unlocking of the network access functions of a multifunction terminal furnished with a security processor, executing a public-key cryptography system, in accordance with the subject matter of the present invention, will now be given in conjunction with FIG. 1.

In the description below, in the relations the variables represented by dots are considered to be not yet instantiated and the variables represented by dashes to be instantiated at a previous step.

With reference to the aforesaid figure, consideration is given to a terminal T that has to access a network N, this terminal T being equipped with a security processor SP (., ., .).

The architecture of the network and of the terminal having to access the latter and also the architecture of the security processor SP are not limiting, the method which is the subject of the present invention applying ultimately to any multifunction terminal with separate or selectable functions, which is furnished with a security processor.

Figure 1:
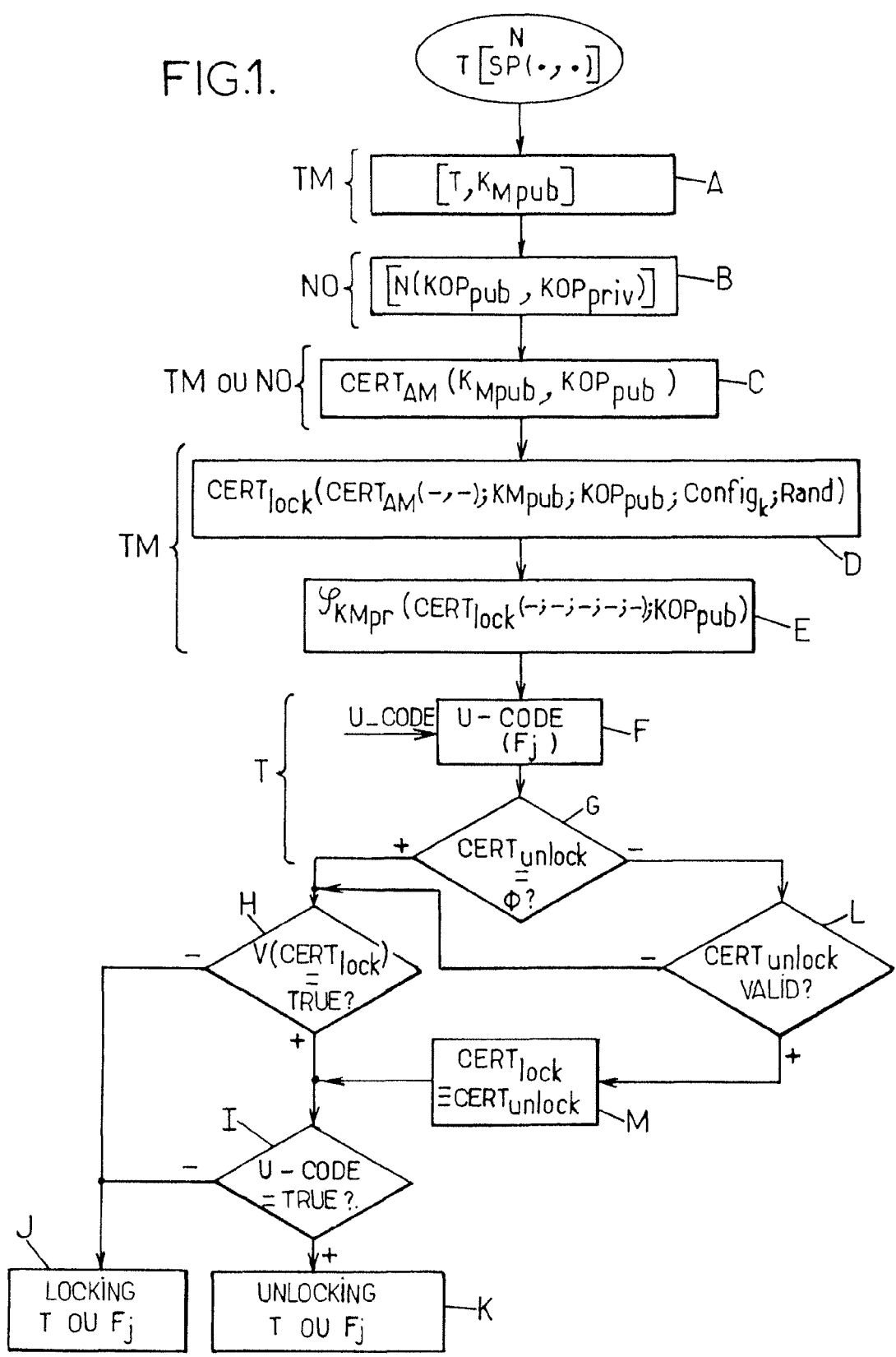
FIG. 1 represents, by way of illustration, a general flowchart of the steps for implementing the method which is the subject of the invention.

As is apparent in FIG. 1, the method which is the subject of the invention involves, in a step A, allotting the terminal T an original public key denoted $K_{Mpub}$ serving to verify the integrity of the data loaded into the terminal.

It is recalled that the original public key $K_{Mpub}$ may be loaded into the relevant terminal by the terminal manufacturer TM, only this public key $K_{Mpub}$ being loaded and present in any relevant terminal. It is recalled moreover that, in accordance with the public-key cryptography system, the private key associated with this original public key $K_{Mpub}$ is in no sense present in the terminal T or in any relevant terminal. The operation of step A is represented by the relation:

$$[T, K_{Mpub}].$$

It is indicated finally that the verification of the integrity of the data loaded into the terminal T can be performed by an operation of verifying the signature of these data that are signed for example, in a conventional manner known per se.

Step A represented in FIG. 1 is followed by step B consisting in generating a pair of keys, public key $KOP_{pub}$ and private key $KOP_{priv}$ which are associated with the access network N of the terminal T.

According to a noteworthy aspect of the method which is the subject of the invention, it is indicated that the operation B is performed by the operator or network access provider NO and that only the public key associated with the access network of the terminal, the key $KOP_{pub}$, is then communicated for example to the manufacturer of terminals and of the terminal T.

As regards the generation of the pair of keys associated with the access network of the terminal T, is indicated that these keys may be constituted by keys of the RSA cryptography algorithm or of any other public-key asymmetric algorithm.

In FIG. 1, in step B, the corresponding operation is denoted:

$$[N(KOP_{pub}, KOP_{priv})]$$

Step B is then followed by a step C consisting in generating an original approval certificate for the terminal, certificate denoted:

$$CERT_{AM}(K_{Mpub}, KOP_{pub}).$$

For the execution of step C, by way of nonlimiting example, it is indicated that the manufacturer of terminals TM can transmit, for example, the original public key $K_{Mpub}$ to the network access provider operator NO, the latter then being able to generate the original approval certificate for the terminal denoted:

$$CERT_{AM}(K_{Mpub}, KOP_{pub}).$$

As a variant, it is indicated however that step C can also be executed by the terminal manufacturer TM since the latter has the parameters necessary for calculating this certificate, that is to say the original public key $K_{Mpub}$, on the one hand, and the public key $KOP_{pub}$ associated with the access network of the terminal, on the other hand.

It is indicated that the execution of step C, either by the terminal manufacturer TM, or by the operator or network access provider NO is immaterial since none of the aforesaid players has all the secrets at his disposal, but on the contrary has at his disposal the parameters necessary for calculating this certificate, that is to say the public keys $K_{Mpub}$ and $KOP_{pub}$.

In any event, the terminal manufacturer TM has available the original approval certificate for the terminal after the execution of step C.

The aforesaid step C is followed by a step D consisting in generating a locking certificate for the terminal so as to initialize the relevant terminal T.

The locking certificate contains at least the original approval certificate for the terminal $CERT_{AM}(-,-)$ obtained in step C, the public keys $K_{Mpub}$ and $KOP_{pub}$ as well as the configuration data denoted $Config_k$, k denoting an identification index for the terminal for example and random data denoted Rand.

Step D of FIG. 1, the locking certificate for the terminal is denoted:

$$CERT_{lock}(CERT_{AM}(-,-); K_{Mpub}; KOP_{pub}; Config_k; Rand).$$

The aforesaid locking certificate and the public key $KOP_{pub}$ which are associated with the access network of the terminal T are then signed digitally in a step E by means of a private key compatible with the original public key $K_{Mpub}$, that is to say by means of the key $K_{Mpr}$ associated with this original public key.

The signing operation of step E can also be executed on the basis of any other key certified by means of the key $K_{Mpr}$, according to the principle of the propagation of trust of public-key architecture.

The corresponding signing operation is of course executed by the terminal manufacturer TM and is denoted in step E of FIG. 1:

$$S_{K_{Mpr}}(CERT_{lock}(-;-;-;-;-);KOP_{pub}).$$

The aforesaid signature value obtained following the implementation of step E is then stored in a secure area of the security processor SP for example.

The aforesaid locking certificate, calculated in step D, and its signed value, calculated in step E, then comprise the original approval certificate for the terminal $CERT_{AM}$, as well as the initial configuration of the locking/unlocking process and of the control of this process as requested by the operator or network access provider, this process being able to correspond to the IMEI standard (International Mobile Equipment Identity) for which the certificate is valid, the network number given by the operator or network N access provider, the data slices relating to the identification of the subscriber using the terminal denoted IMSI slice (International Mobile Subscriber Identity), if appropriate the inhibiting of certain of the service functions of the terminal T, for example.

The aforesaid locking certificate moreover contains the aforesaid random data Rand which makes it possible, definitively, to distinguish any terminal $T_k$ from another terminal of the same type.

In step E, the storage operation thus makes it possible to place the locking certificate accompanied by the public key $KOP_{pub}$ associated with the access network of the terminal in the aforesaid terminal T, at the time that the latter is manufactured in the factory, and of course advantageously in a secure area of the security processor SP.

During the use of the relevant terminal by a user, the latter, in step F, is required to introduce a code denoted U_CODE via one of the peripherals of the relevant terminal.

Following the introduction of the aforesaid code, the method of controlling the locking/unlocking of the network access functions of a multifunction terminal, which is the subject of the invention, consists in verifying at least, in step G, the existence or the absence of an unlocking certificate denoted $CERT_{unlock}$ for at least one function or, in verifying the presence of an invalid unlocking certificate.

It is understood that this verifying step, although not indispensable for the first use of the terminal T, is thereafter rendered necessary so as to take account of any earlier use, that is to say ultimately, the activation of technical or service functions $F_j$ already executed by the user at the level of the terminal T.

The verifying step represented in step G of FIG. 1 may correspond to a test step:

$CERT_{unlock} = \emptyset$?

On a positive response to the step G of FIG. 1, the method which is the subject of the invention consists in verifying the integrity of the locking certificate $CERT_{lock}$ available permanently in the secure memory of the security processor.

Such an operation is illustrated in step H of FIG. 1 by the operation:

$\mathcal{V}(CERT_{lock})$?

The aforesaid verifying operation can be performed by verifying the signature of the signature value stored in the previous step E on the basis of the original public key $K_{Mpub}$ which the terminal T has at its disposal. This verification may be performed by means of the original public key $K_{Mpub}$. It makes it possible to verify that the elements specified in this certificate are compatible, in particular security processor PS or SIM card of the correct network operator, IMSI slices and IMEI control verified, for example.

On a negative response to the verifying operation of the aforesaid step H, a step J is called for locking the whole set of functions of the terminal T or at the very least, technical or service functions of the terminal which correspond to the configuration data $Config_k$ contained in the locking certificate.

Conversely, on a positive response in step H of FIG. 1, the terminal T can then be unlocked conditionally upon the successful verification of the locking certificate in step H and upon the validity of the code U_CODE introduced by the user.

The corresponding operations are represented in FIG. 1 for a positive response in step H of verifying the integrity of the locking certificate by a step of verifying the code U_CODE according to the relation:

U_CODE=true?

in step I.

On a negative response to the test of step I, the terminal T or the function $F_j$ associated with the code U_CODE introduced is kept locked in step J.

Conversely, on a positive response to the test of step I, the unlocking of the terminal T or of the function $F_j$ can then be performed in step K by virtue for example of the issuing by the security processor PS of an unlocking certificate corresponding to the service functions of the terminal that are actually unlocked having regard to any earlier unlocking situation.

Conversely, on a negative response to the test of step G, that is to say in the presence of an existing valid unlocking certificate $CERT_{unlock}$, the validity of this certificate is verified in a step L in a conventional manner.

On a negative response to the test of step L, a return to the test of step H may be performed.

Conversely, on a positive response to the test of step L, the locking certificate can then be substituted for the locking certificate $CERT_{lock}$ so as to continue the process in step M and return for example to step I of verifying the user code.

Represented moreover in FIG. 1 is the identity of the players effecting the various steps of the method which is the subject of the invention, these players being designated by TM for terminal manufacturer, NO for operator or network access provider, T for the terminal proper and SP for the security processor with which the latter is equipped.

A more detailed description of the steps H of verifying the integrity of the locking certificate and I of verifying the user code that are represented in FIG. 1 will now be given in conjunction with FIG. 2.

For the execution of the aforesaid steps, it is recalled that the terminal T has at its disposal the locking certificate $CERT_{lock}$ the unlocking certificate $CERT_{unlock}$ if the latter exists as mentioned previously as a function of the conditions of use of the terminal and of the user code U_CODE previously mentioned.

To perform the locking/unlocking control operation, the terminal T proceeds in a step $H_0$ to the transmission from the terminal to the security processor SP of the locking certificate, of the unlocking certificate if the latter exists and of the code entered by the user.

Figure 2:
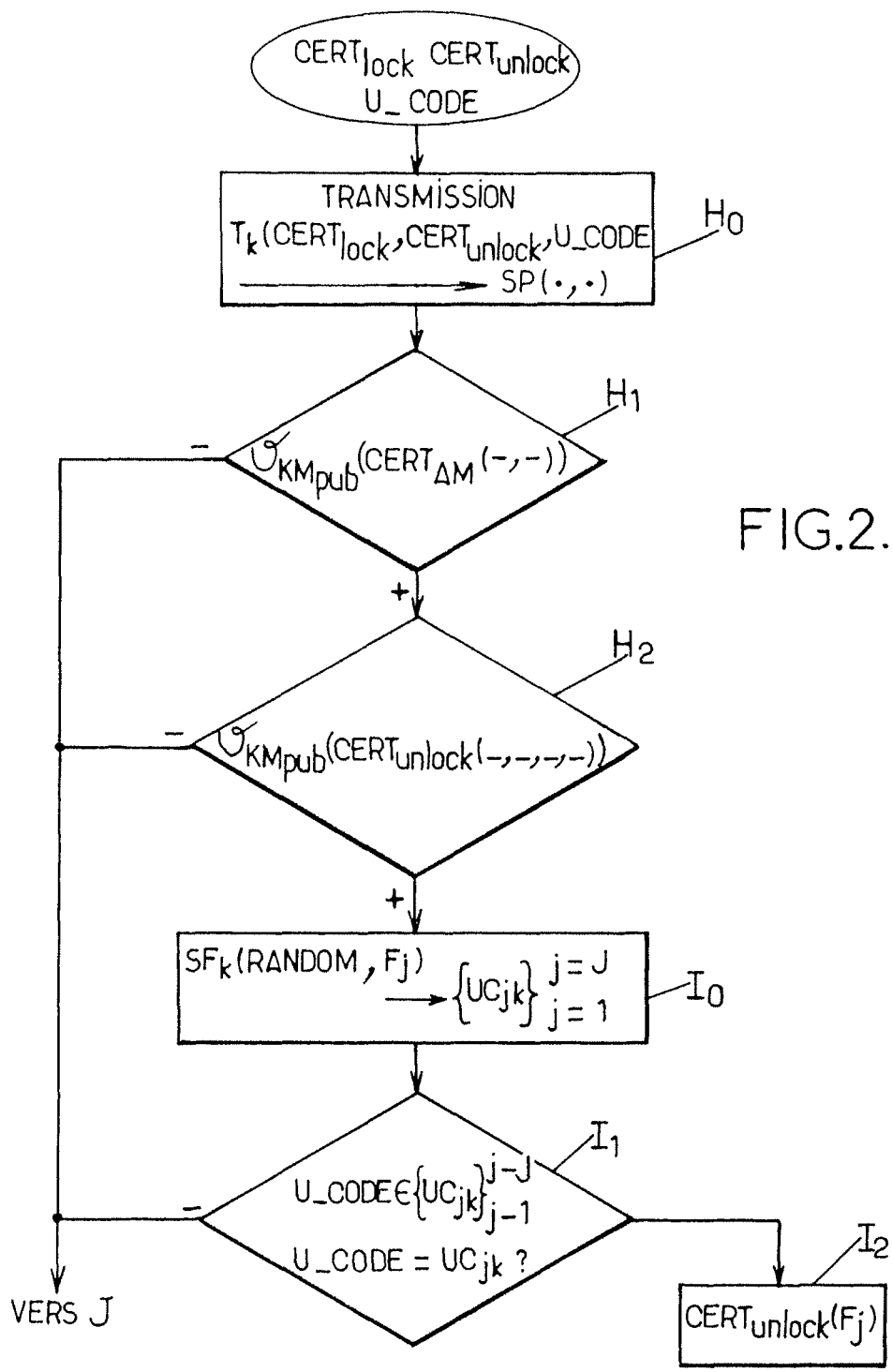
FIG. 2 represents, by way of illustration, a flowchart of a detail of the implementation of the steps of verification of the locking certificate and of validation of the user code, that are represented in FIG. 1.

Step $H_0$ of FIG. 2 is represented by the relation:

$$T_k \xrightarrow{(CERT_{lock}, CERT_{unlock}, U\_CODE)} SP(.,.).$$

Step $H_0$ is followed by a step $H_1$ consisting in verifying the integrity of the original approval certificate for the terminal, the certificate $CERT_{AM}(-,-)$.

In step $H_1$ this operation is represented by the relation:

$\mathcal{V}_{KMpub}(CERT_{AM}(-,-))$.

On a negative response to this verifying operation, a return to the locking step J of FIG. 1 is executed.

Conversely, on a positive response to the test of step $H_1$ a step $H_2$ is called, which consists in validating the locking certificate $CERT_{lock}$ by means of the original public key.

In step $H_2$, this operation is denoted:

$\mathcal{V}_{KMpub}(CERT_{lock}(-,-,-,-,-))$.

On a negative response to this step $H_2$, a return to the locking step J of FIG. 1 is executed.

On a positive response to step $H_2$, the security processor SP then executes the establishing of the set of codes that can be introduced by the user, on the basis of the random data sequence contained in the locking certificate $CERT_{lock}$ and of the specific function, denoted $SF_k$, executed by the security processor SP.

In step $I_0$ of establishing the set of codes that can be introduced by the user, the operation for establishing the aforesaid codes is denoted by the relation:

$SF_k(\text{Random}, F_j) \rightarrow \{UC_{jk}\}_{j=1}^{j=J}$.

In the above relation, it is understood that the specific function $SF_k$ peculiar to the terminal $T_k$ is executed by a security processor SP with which the latter is equipped, on the basis of a set of technical or service functions $F_j$ of the terminal T of the aforesaid random values Random, so as to give rise to the set of user codes that can be introduced by the latter denoted:

$\{UC_{jk}\}_{j=1}^{j=J}$.

In a general manner it is indicated that the specific function $SF_k$ makes it possible to generate the set of unique codes $UC_{jk}$ that can be generated by the user, a code $U_{jk}$ associated with a function $F_j$ of the terminal being generated for one and only one terminal $T_k$. Thus, by way of example, a possible code $UC_{jk}$ must be generated to deactivate the locking of access to the network, another code to activate the locking of access to the network, a code for unblocking the WAP function respectively inhibiting the latter, or the like. The specific function $SF_k$ may be executed by an algorithm of the HMAC-SHA$_1$ type, an AES/A5-3 encryption or any other nonreversible algorithm, activated on the basis of a seed provided by the operator or network access provider ON.

It is understood of course that the user code U_CODE entered by the user must then correspond to one of the codes $UC_{jk}$ of the set of valid unique codes generated in step $I_0$.

Step $I_0$ is then followed by a step $I_1$ in which the security processor SP compares any code entered by the user U_CODE with the set of valid unique codes $\{UC_{jk}\}_{j=1}^{j=J}$.

In step I1 this operation is represented by the relation:

$$U\_CODE \in \{UC_{jk}\}_{j=1}^{j=J}$$

$$(U\_CODE = UC_{jk})?$$

On a negative response to the test of step I1, the return to the locking step J is executed.

On a positive response to the test of I1, an unlocking certificate for the function or functions Fj can be calculated in step I2 so as to subsequently execute the unlocking in step K of FIG. 1.

Thus, with reference to FIG. 2, it is understood that if the code U_CODE entered by the user does not correspond to any of the codes of the set of valid unique codes, the security processor SP generates an error code which is then returned to the terminal T by way of the step J and the configuration of the terminal corresponding to the locking certificate $CERT_{lock}$ or to a preexisting unlocking certificate $CERT_{unlock}$ is kept.

Conversely, if the code entered by the user corresponds to a unique code of the set of unique codes the security processor generates an unlocking certificate $CERT_{unlock}$ relating to the corresponding service function $F_j$ of the user terminal and verifies the integrity of this unlocking certificate within the framework of step K represented in FIG. 1.

A more detailed description of a system for controlling the locking/unlocking of the network access functions of a multifunction terminal furnished with a security processor, which is the subject of the invention, will now be described in conjunction with FIG. 3.

The terminal T is represented in a nonlimiting manner in the form of a mobile telephone terminal furnished with a keypad KB, with a central processing unit CPU, with a work memory RAM and with a secure program memory ROM for example.

The secure memory makes it possible to drive the service functions of the terminal T and in particular everything relating to the loudspeaker HP or microphone functions for example in a conventional manner.

Figure 3:
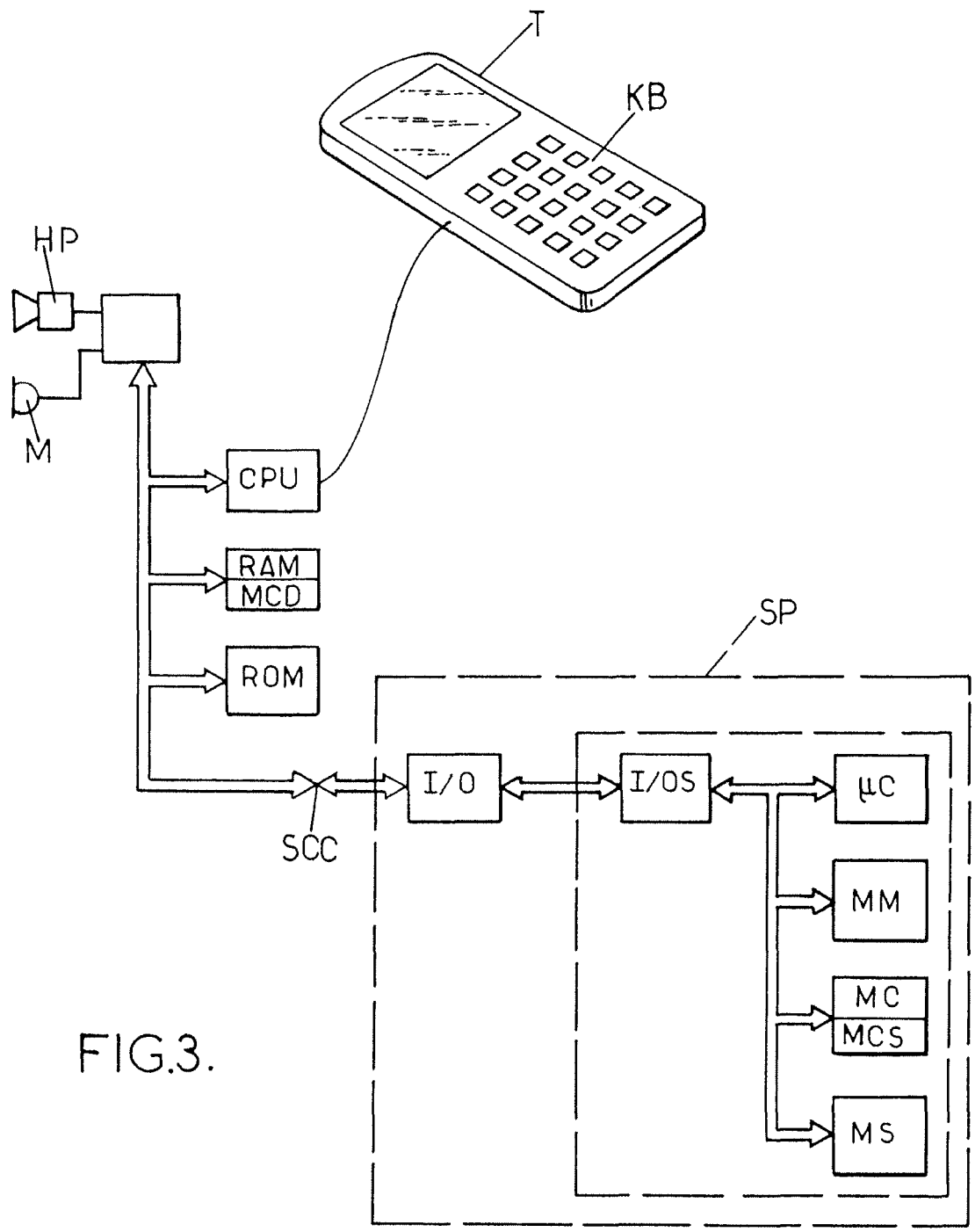
FIG. 3 represents the architecture of a system for controlling the locking/unlocking of the network access functions of a multifunction terminal furnished with a security processor, which is the subject of the invention, in a preferred nonlimiting mode of implementation taken by way of example, in which the terminal is a mobile telephone terminal and the security processor a SIM card.

The terminal T is moreover equipped with a security processor SP which is represented in this situation, in a nonlimiting manner, as a SIM card connected to the bus of the central unit CPU of the terminal T by way of a SIM card connector denoted SCC in FIG. 3.

In a conventional manner, the security processor SP comprises in addition to an input/output facility I/O, a secure input/output facility I/OS and a microcontroller μC, at least one public-key cryptographic module MC and of course, a work memory MM.

All of the aforesaid components are installed in an inaccessible secure area of the security processor SP.

As represented in FIG. 3, the terminal T comprises at least one module for storing cryptographic data MCD so as to allow in particular the storage of the keys.

It is understood, however, that any item of cryptographic data corresponding to a public key can be stored at an unprotected area of the terminal T, this area possibly corresponding however to a flash memory or the like making it possible to preserve the aforesaid cryptographic data.

The aforesaid area MC also makes it possible to store for example the original approval certificate for the terminal T, certificate denoted:

$$CERT_{AM}(K_{Mpub}, KOP_{pub}).$$

This area also makes it possible to store the public key $KOP_{pub}$ associated with the network.

With reference to the same FIG. 3, it is indicated that the cryptography module of the security processor SP comprises, as represented in the aforesaid figure, secure resources for storing a private key that is compatible with the original public key $P_{Mpub}$. This area is denoted MCS in FIG. 3.

Furthermore, the security processor SP comprises a module denoted MC for calculating a locking certificate for the terminal containing at least the original approval certificate for the terminal the configuration data for this terminal and the random data sequence designated Random previously in the description.

The security processor SP finally comprises, in the aforesaid calculation module MC, resources for calculating digital signatures of the aforesaid locking certificate and of the public key $KOP_{pub}$ associated with the access network of the terminal T, these signature calculation resources operating on the basis of the RSA algorithm for example by means of the private key compatible with the original public key $K_{Mpub}$.

The signature resources may also consist of a separate module denoted MS.

Finally, as represented moreover in FIG. 3, the user terminal T advantageously comprises a resource for storing at least one user code associated with a function of the relevant terminal T. The aforesaid storage resources also allow the storage of the locking certificate $CERT_{lock}$ and of an unlocking certificate, these storage resources possibly consisting of the module MCD described previously in the description.

The security processor SP also comprises cryptographic calculation resources, in the module MC for example, making it possible in the absence of any unlocking certificate for at least one service function of the terminal T or in the presence of an unlocking certificate to perform a verification of the integrity of the locking certificate and of the elements contained in this locking certificate as described previously in step H of FIG. 1 and in substeps $H_0$, $H_1$, $H_2$ of FIG. 2.

Finally, the cryptographic module of the security processor SP comprises resources for unlocking and authorizing the use of the terminal T or of a specific function thereof conditionally upon the successful verification of the certificate of the locking $CERT_{lock}$ and upon the validity of the user code introduced U_CODE. The resources for unlocking and authorizing use are for example advantageously integrated into the cryptographic calculation module MC and make it possible to keep the terminal or the specific function Fj locked in the absence of authorization.

The invention also covers a computer program product comprising a series of instructions stored on a storage medium for execution by a computer or by a user terminal furnished with a security processor.

During this execution, the corresponding program executes the steps of the method as it is described previously in the description in conjunction with FIGS. 1 and 2.

In particular, the aforesaid program comprises modules of public-key cryptography programs installed in the cryptographic module of the security processor SP and allowing at least the verification of a locking certificate $CERT_{lock}$.

The aforesaid program furthermore comprises command modules for unlocking and authorizing the use of the terminal or of a function $F_j$ of this terminal, conditionally upon the successful verification of the locking certificate and upon the validity of the user code introduced U_CODE.

It furthermore makes it possible to keep the terminal or a technical or service function of this terminal in its state when, conversely, the aforesaid condition is not satisfied. The unlocking command modules are installed in a protected area of the security processor SP and in particular in the module MC for example.

The method and the system for controlling the locking/unlocking of the network access functions of a multifunction terminal which are the subject of the invention appear particularly advantageous in so far as they make it possible for the terminal manufacturer not to know the unlocking codes of the terminals, fully managed in the security processor of the terminal and to forewarn the manufacturer of any risk of suspicion of being the origin of a leak of the unlocking codes.

The invention claimed is:

1. A method of controlling the locking/unlocking of the network access functions of a multifunction terminal including a security processor, executing a public-key cryptography system, wherein said method includes at least:
   a) allotting said terminal an original public key serving to verify the integrity of data loaded into said terminal;
   b) generating a pair of keys, including a public key and a private key associated with the access network of said terminal;
   c) generating an original approval certificate for said terminal containing said public keys, including said original public key and said public key associated with the access network of said terminal;
   d) establishing for initialization a locking certificate for said terminal containing at least said original approval certificate for said terminal, data for initial configuration of this terminal and a sequence of random data, and storing said locking certificate and said public key associated with the access network of said terminal in a secure area of said security processor, said locking certificate and said public key being signed digitally on the basis of a private key compatible with said original public key and, on boot up for use of said terminal by introduction of a code by a user;
   e) in the absence of an unlocking certificate for at least one function of the terminal or in the presence of an invalid unlocking certificate, verifying at least the integrity of said locking certificate stored in said secure area of said security processor, and the elements contained in this locking certificate; and
   f) unlocking and authorizing the use of said terminal or of a specific function of said terminal, conditionally upon a successful verification of said locking certificate stored in said secure area of said security processor and upon validity of the code introduced; and keeping said terminal or said specific function locked and not authorizing the use thereof, otherwise.

2. The method according to claim 1, wherein in the presence of a valid unlocking certificate, said unlocking certificate is substituted for said locking certificate in order to continue the process.

3. The method according to claim 1, wherein the step of verifying said locking certificate includes at least the transmission, from said terminal to said security processor, of said locking certificate, of said unlocking certificate if it exists and of the user code.

4. The method according to claim 3, wherein said security processor furthermore executes:
   verifying the integrity of said original approval certificate for said terminal; and, on a successful verification,
   validating of said locking certificate by means of said original public key; and, following said validation,
   establishing the whole set of codes that can be introduced by said user, on the basis of said random data sequence contained in said locking certificate and of a specific function executed by said security processor.

5. The method according to claim 4, wherein said specific function makes it possible to generate the whole set of valid unique codes that can be generated by said user, a code associated with a function of the terminal being generated for one and only one terminal.

6. The method according to claim 4, wherein said security processor compares any code entered by said user with the whole set of valid unique codes, and,
   if the code entered by said user does not correspond to any of the codes of the set of valid unique codes, said security processor generates an error code, returned to said terminal and the configuration of the terminal corresponding to said locking certificate or to an unlocking certificate that is preexisting is kept; otherwise,
   if the code entered by said user corresponds to a unique code of the set of unique codes, said security processor generates an unlocking certificate relating to the corresponding function and verifies the integrity of said unlocking certificate.

7. The method according to claim 1, wherein step a) is executed by the manufacturer of said terminal.

8. The method according to claim 1, wherein step b) is executed by the operator or network access provider.

9. The method according to claim 1, wherein step c) is executed either by the manufacturer of said terminal, or by the operator or the network access provider.

10. The method according to claim 1, wherein said step d) is executed by the manufacturer of said terminal.

11. A system for controlling the locking/unlocking of the network access functions of a multifunction terminal including a security processor, executing a public-key cryptography system, said security processor comprising at least one secure input/output control circuit, a microcontroller and at least one public-key cryptography module, wherein said terminal comprises at least:
   a cryptographic data storage module including an original public key serving to verify the integrity of data loaded into said terminal, a public key of a pair of keys including said public key and said private key associated with the access network of said terminal, and original approval certificate for said terminal containing said public keys, said original public key and said public key associated with said access network of said terminal; and, said cryptography module of said security processor including at least:
   storage resources that store a private key compatible with said original public key;
   a terminal locking certificate calculating module containing at least said original approval certificate for said terminal, data for configuration of said terminal and a sequence of random data; and
   said private key compatible with said original public key, wherein said private key allows for digitally signing said locking certificate and said public key associated with the access network of said terminal.

12. The system according to claim 11, wherein said user terminal furthermore includes:
   wherein the storage resources store at least one user code associated with a function of said terminal, a locking certificate and an unlocking certificate, and wherein said cryptography module is configured to verify, in the absence of any unlocking certificate for at least one function of said terminal or in the presence of an invalid unlocking certificate, the integrity of said locking certificate and of the elements contained in said locking certificate, said terminal furthermore including:

unlocking and authorization command modules, wherein the unlocking and authorization command modules unlock and authorize use of said terminal or of a specific function of said terminal, conditionally upon a successful verification of said locking certificate and upon the validity of the user code introduced, said locking and authorization command modules keep said terminal or said specific function locked, in the absence of authorization for use, otherwise.

13. A non-transitory computer storage medium for storing computer program product comprising a series of instructions for execution by a computer or by a user terminal including a security processor, wherein, during this execution, said program executes the steps of the method according to claim 1.

14. The non-transitory computer storage medium for storing a computer program product according to claim 13, wherein said program comprises modules of public-key cryptography programs installed in said cryptographic module of said security processor adapted to execute the verification of a locking certificate.

15. The non-transitory computer storage medium for storing a computer program product according to claim 13, wherein said program furthermore includes modules for commanding unlocking and authorization of the use of said terminal or of a function of said terminal, conditionally upon the successful verification of said locking certificate and upon the validity of the user code introduced, or for keeping said terminal or a service function of said terminal in its state, otherwise, said command modules being installed in a protected area of said security processor.

16. The method according to claim 1, wherein in step f, upon an unsuccessful verification of said locking certificate or upon invalidity of the code introduced, keeping said terminal or said specific function locked and not authorizing the use thereof according to the data for initial configuration contained in the locking certificate.

* * * * *